United States Patent
Yamashita et al.

(10) Patent No.: US 12,516,208 B2
(45) Date of Patent: Jan. 6, 2026

(54) WATER-BASED INK, INKJET RECORDING METHOD, INKJET RECORDING DEVICE, INK STORAGE CONTAINER, AND PRINTED RECORDING MEDIUM

(71) Applicant: BROTHER KOGYO KABUSHIKI KAISHA, Nagoya (JP)

(72) Inventors: Narumi Yamashita, Kuwana (JP); Tomoyo Tahara, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 38 days.

(21) Appl. No.: 18/184,173

(22) Filed: Mar. 15, 2023

(65) Prior Publication Data
US 2023/0303873 A1    Sep. 28, 2023

(30) Foreign Application Priority Data
Mar. 28, 2022 (JP) ................. 2022-051102

(51) Int. Cl.
| | | |
|---|---|---|
| C09D 11/38 | (2014.01) | |
| B41J 2/175 | (2006.01) | |
| C09D 11/322 | (2014.01) | |
| C09D 11/324 | (2014.01) | |

(52) U.S. Cl.
CPC ........... *C09D 11/38* (2013.01); *B41J 2/17503* (2013.01); *C09D 11/322* (2013.01); *C09D 11/324* (2013.01)

(58) Field of Classification Search
CPC .. C08J 3/05; C08J 3/03; C09D 11/322; C09D 11/00; C09D 11/40; C09D 11/033; C09D 11/38; C09D 175/04; C09D 11/30; B41J 2/01; B41J 2/175; B41M 5/00; A01N 25/30

See application file for complete search history.

(56) References Cited

U.S. PATENT DOCUMENTS

| | | | |
|---|---|---|---|
| 5,609,671 A | 3/1997 | Nagasawa | |
| 5,830,264 A * | 11/1998 | Fujioka | C09D 11/30 347/100 |

(Continued)

FOREIGN PATENT DOCUMENTS

| | | |
|---|---|---|
| JP | H08-3498 A | 1/1996 |
| JP | 2000513396 A | 10/2000 |

(Continued)

OTHER PUBLICATIONS

JP-2000513396-A, WO-97048769A1.

(Continued)

*Primary Examiner* — John P Zimmermann
(74) *Attorney, Agent, or Firm* — Element IP, PLC

(57) ABSTRACT

A water-based ink includes a pigment, an amino acid having an alkylene group with three or more carbon atoms and having amino groups on a side chain thereof, a surfactant and/or a penetrating agent, and water. The surfactant includes an acetylene based surfactant. The penetrating agent includes an alkylene diol, a glycol ether compound, or both. An amount of the amino acid in the water-based ink relative to a total mass of the water-based ink is from 0.05 to 1 mass %. The amino acid is preferably arginine, lysine, or both. The water-based ink preferably further includes two or more wetting agents.

15 Claims, 1 Drawing Sheet

(56) References Cited

U.S. PATENT DOCUMENTS

| | | | | |
|---|---|---|---|---|
| 5,972,082 | A | * | 10/1999 | Koyano ............... C09D 11/38 106/31.86 |
| 6,821,330 | B1 | * | 11/2004 | Sano .................... C09D 11/322 106/31.89 |
| 7,964,033 | B2 | * | 6/2011 | Sujeeth ............. C09B 68/46775 106/497 |
| 2008/0241398 | A1 | | 10/2008 | Kato et al. |
| 2009/0233059 | A1 | | 9/2009 | Ota et al. |
| 2009/0264578 | A1 | * | 10/2009 | Minaki ............. C08G 18/0866 524/502 |
| 2012/0029146 | A1 | * | 2/2012 | Matsui ................ C08G 18/755 524/591 |
| 2013/0053495 | A1 | | 2/2013 | Okuda et al. |
| 2013/0267570 | A1 | * | 10/2013 | Premachandran ..... A01N 43/80 514/372 |
| 2017/0369725 | A1 | * | 12/2017 | Mitsuyoshi ............ C09D 11/38 |
| 2019/0023927 | A1 | * | 1/2019 | Hama ................ B41M 5/0023 |
| 2021/0395546 | A1 | * | 12/2021 | Fukui ........................ B41J 2/01 |

FOREIGN PATENT DOCUMENTS

| | | | |
|---|---|---|---|
| JP | 2002338860 | A | 11/2002 |
| JP | 2003128965 | A | 5/2003 |
| JP | 2003313470 | A | 11/2003 |
| JP | 2007211221 | A | 8/2007 |
| JP | 2008524400 | A | 7/2008 |
| JP | 2008246821 | A | 10/2008 |
| JP | 2009515007 | A | 4/2009 |
| JP | 2010222418 | A | 10/2010 |
| JP | 2011001485 | A | 1/2011 |
| JP | 2011515535 | A | 5/2011 |
| JP | 2013049772 | A | 3/2013 |
| WO | WO-97048769 | A1 | 12/1997 |
| WO | WO-2006066132 | A2 | 6/2006 |
| WO | WO-2007053564 | A2 | 5/2007 |
| WO | WO-2009117071 | | 9/2009 |
| WO | WO-2021259612 | A1 | 12/2021 |

OTHER PUBLICATIONS

JP-2008246821-A, US-20080241398-A1.
JP-2008524400-A, WO-2006066132A2.
JP-2009515007-A, WO-2007053564A2.
JP-2011515535-A, WO-2009117071A1.
JP-2013049772-A, US-20130053495-A1.
JP-H08-3498A, US-5609671-A.
Extended European Search Report issued Aug. 7, 2023 in Patent Application No. 23161746.5, 6 pages.

* cited by examiner

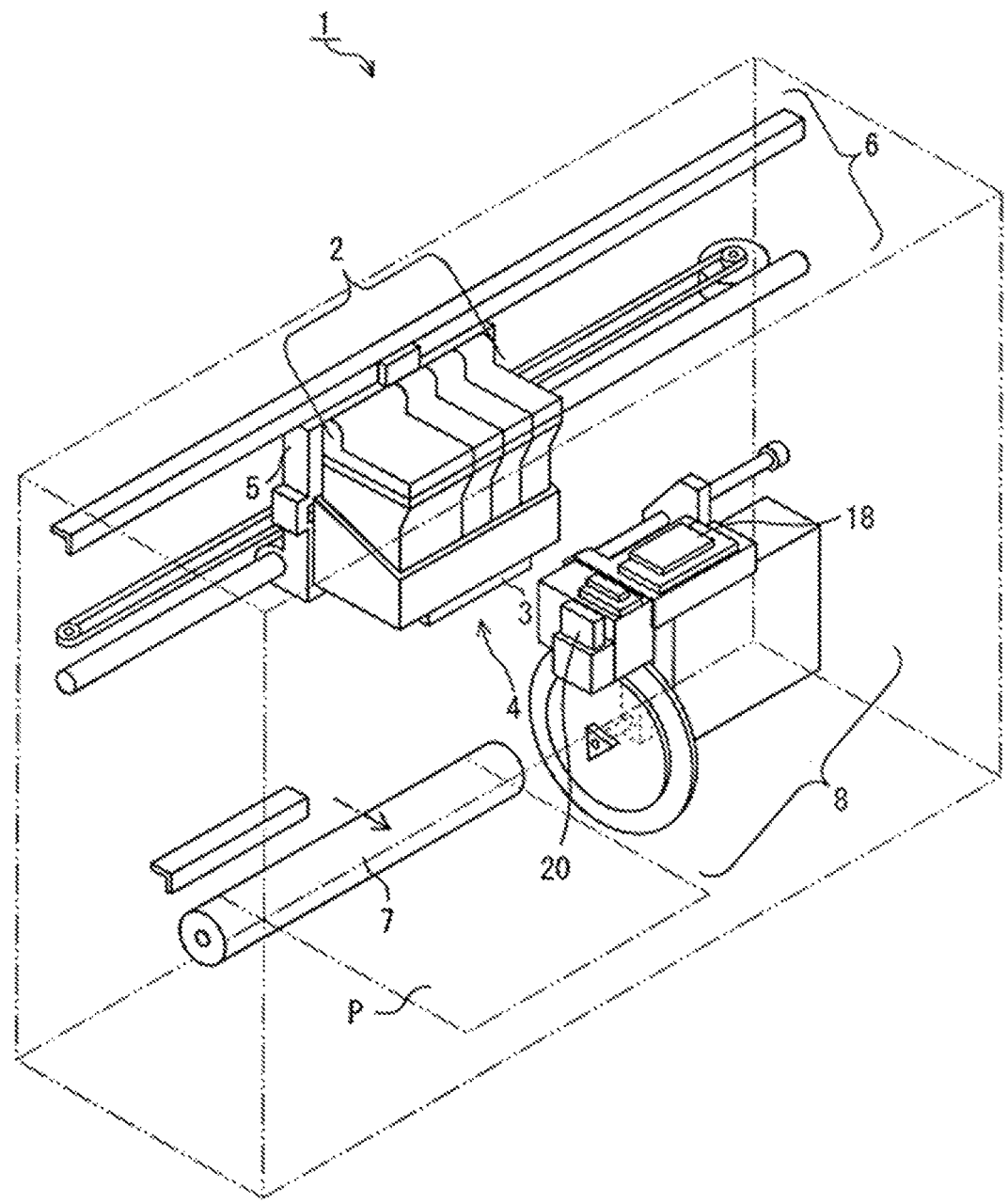

WATER-BASED INK, INKJET RECORDING METHOD, INKJET RECORDING DEVICE, INK STORAGE CONTAINER, AND PRINTED RECORDING MEDIUM

REFERENCE TO RELATED APPLICATIONS

The present application claims priority to Japanese Patent Application No. 2022-051102 filed Mar. 28, 2022, the contents of which are incorporated herein by reference in their entirety.

BACKGROUND ART

An ink composition containing triethanolamine (TEA) as a pH adjusting agent is known.

SUMMARY

According to an aspect of the present disclosure, a water-based ink for inkjet recording, includes: a pigment; an amino acid having an alkylene group with three or more carbon atoms and having amino groups on a side chain thereof; a surfactant and/or a penetrating agent; and water. The surfactant includes an acetylene based surfactant. The penetrating agent includes an alkylene diol, a glycol ether compound, or both. An amount of the amino acid in the water-based ink relative to a total mass of the water-based ink is from 0.05 to 1 mass %.

According to another aspect of the present disclosure, an inkjet recording method includes ejecting the above-described water-based ink onto a recording medium using an inkjet method.

According to a further aspect of the present disclosure, an inkjet recording device includes: an ink storing part; the above-described water-based ink, stored in the ink storing part; and an ink ejecting part configured to eject the water-based ink.

According to a further aspect of the present disclosure, an ink storage container includes the above-described water-based ink, stored therein.

According to a further aspect of the present disclosure, a printed recording medium includes: a recording medium; and the above-described water-based ink, provided on the recording medium.

BRIEF DESCRIPTION OF THE DRAWING(S)

A more complete appreciation of the disclosure and many of the attendant advantages thereof will be readily obtained as the same becomes better understood by reference to the following detailed description when considered in connection with the accompanying drawings, wherein: the FIGURE is a schematic diagram of an example of an inkjet recording device.

DESCRIPTION

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

There is demand to reduce the formulation amount of TEA (including not adding TEA, same hereinafter), from the standpoint of adaptability of the water-based ink composition. In addition, there is a need for improved redispersibility of water-based inks for inkjet recording that contain pigments.

An embodiment of the present disclosure relates to a water-based ink for inkjet including: pigment, an amino acid having n=3 or more alkylene groups and amino groups on a side chain thereof, at least one of a surfactant or penetrating agent, and water; wherein the surfactant is an acetylene based surfactant; the penetrating agent is one or more penetrating agent selected from alkylene diols and glycol ether compounds; and a formulation amount of the amino acid in the total amount of water-based ink for inkjet recording is 0.05% or more and 1% or less.

The water-based ink for inkjet recording contains pigment, a specific amino acid, and at least one of a specific surfactant and a specific penetrating agent, and the redispersibility can be improved without adding TEA or with a reduced formulation amount of TEA by using a prescribed amount of the specific amino acid.

In the present disclosure, the term "mass" may be interpreted as "weight" unless otherwise specified. For example, "mass ratio" may be interpreted as "weight ratio" unless otherwise specified, and "mass %" may be interpreted as "weight %" unless otherwise specified.

The water-based ink for inkjet recording of the present disclosure (hereinafter referred to as "water-based ink" or "ink") is described below. The water-based ink contains pigment, an amino acid having n=3 or more alkylene groups and amino groups in a side chain thereof, at least one surfactant or penetrating agent, and water.

The pigments include, for example, resin-dispersed pigments and self-dispersing pigments.

The above resin-dispersible pigments are dispersible in water, for example, by means of a resin for pigment dispersion (resin dispersing agent). The pigments that can be used as resin-dispersed pigments are not particularly limited, and include, for example, carbon black, inorganic pigments, and organic pigments. Examples of carbon black include furnace black, lamp black, acetylene black, channel black, and the like. Examples of inorganic pigments include titanium dioxide, iron oxide inorganic pigments, carbon black inorganic pigments, and the like. Examples of the organic pigments include azo pigments such as azo lakes, insoluble azo pigments, condensed azo pigments, chelated azo pigments; polycyclic pigments such as phthalocyanine pigments, perylene and perinone pigments, anthraquinone pigments, quinacridone pigments, dioxazine pigments, thioindigo pigments, isoindolinone pigments, quinophthalone pigments, and the like; dye lake pigments such as basic dye-type lake pigments and acid dye-type lake pigments; nitro pigments; nitroso pigments; aniline black daylight fluorescent pigments; and the like. Specific examples of these pigments include C.I. Pigment Black 1, 6 and 7; C.I. Pigment Yellow 1, 2, 3, 12, 13, 14, 15, 16, 17, 55, 73, 74, 75, 78, 83, 93, 94, 95, 97, 98, 114, 128, 129, 138, 150, 151, 154, 180, 185 and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224 and 238; C.I. Pigment Violet 19 and 196; C.I. Pigment Blue 1, 2, 3, 15, 15:1, 15:2, 15:3, 15:4, 16, 22 and 60; C.I. Pigment Green 7 and 36; and solid solutions of these pigments, and the like.

A general polymer dispersing agent and the like may be used as a resin dispersing agent. For example, a resin dispersing agent containing at least one of methacrylic acid or acrylic acid as a monomer can be used, including commercially available products for example. The above resin dispersing agent may be, for example, block copolymers, graft copolymers, or random copolymers containing two or more monomers selected from the group consisting of: hydrophobic monomers such as styrene, styrene derivatives, vinylnaphthalene, vinylnaphthalene derivatives, aliphatic alcohol esters of α,β-ethylenically unsaturated carboxylic acid; acrylic acid; acrylic acid derivatives; maleic acid; maleic acid derivatives; itaconic acid; itaconic acid derivatives; fumaric acid; and fumaric acid derivatives, or salts thereof. Commercial products include, for example, "Joncryl (registered trademark) 611", "Joncryl® 60", "Joncryl® 586", "Joncryl® 687", "Joncryl® 63", and "Joncryl® HPD296" manufactured by Johnson Polymer Co. Ltd.; "Disperbyk190" and "Disperbyk191" manufactured by BYK Chemie; "Solsperse 20000" and "Solsperse 27000", and the like, manufactured by AstraZeneca; and the like.

The pigment may be a self-dispersing pigment. The self-dispersing pigments include those that can be dispersed in water without the use of a dispersing agent, for example, by introducing at least one hydrophilic functional group such as a carbonyl group, hydroxyl group, carboxylic group, sulfonate group, phosphate group, or the like, or salts thereof, directly or via other groups into the pigment particles by chemical bonds. The self-dispersing pigments can be those where a pigment is treated by the methods described in Japanese Unexamined Patent Application No. H8-3498 (EP 688836), Japanese PCT Unexamined Patent Application No. 2000-513396 (U.S. Pat. No. 5,837,045), Japanese PCT Unexamined Patent Application No. 2008-524400 (US2006/201380), Japanese PCT Unexamined Patent Application No. 2009-515007 (US2007/100023, US2007/100024), Japanese PCT Unexamined Patent Application No. 2011-515535 (US2009/229489), and the like (the contents of these application are incorporated herein by reference in their entirety). Both inorganic and organic pigments can be used as raw materials for the self-dispersing pigments. Pigments suitable for the above treatment include, for example, carbon blacks such as MA8 and MA100, manufactured by Mitsubishi Chemical Corporation. The self-dispersing pigments described above may be commercially available, for example. The commercial products include, for example, CAB-O-JET® 200, CAB-O-JET® 250C, CAB-O-JET® 260M, CAB-O-JET® 270Y, CAB-O-JET® 300, CAB-O-JET® 400, CAB-O-JET® 450C, CAB-O-JET® 465M, and CAB-O-JET® 470Y, manufactured by Cabot Specialty Chemicals; BONJET® BLACK CW-2 and BONJET® BLACK CW-3, manufactured by Orient Chemical Industries Co., and LIOJET® WD BLACK 002C, manufactured by Toyo Ink Manufacturing, and the like.

One of the pigments may be used alone or a combination of two or more pigments may be used.

The formulation amount of pigment solids in the total amount of water-based ink (pigment solids content) is not particularly limited and can be determined according to the desired optical density, and the like, for example. The pigment solid content is, for example, 0.1 weight % to 20 weight %, 1 weight % to 10 weight %, or 2 weight % to 8 weight %.

In addition to the pigments, the water-based ink may also contain dyes and the like.

The method of dispersing the pigments using the resin dispersing agent is, for example, to disperse the pigment using a dispersing device. The dispersing device used for dispersion of the pigments is not limited so long as they are general dispersion machines, such as ball mills, roll mills, sand mills (e.g., high-speed type), and the like.

The amino acid contains n=3 or more alkylene groups and amino groups on a side chain thereof. The amino acid is, for example, at least one of arginine and lysine. The amino acid is used as a pH adjusting agent.

The formulation amount of the amino acid in the total amount of the water-based ink is, for example, 0.01 mass % to 3 mass %, 0.01 mass % to 2 mass %, or 0.05 mass % to 1 mass %. One of the amino acids may be used alone or a combination of two or more types may be used.

The water-based ink contains at least an acetylene surfactant as the surfactant. The acetylene surfactant, for example, may be a commercially available product. Examples of commercial products include: OLFINE® E1004, OLFINE (registered trademark) E1008, and OLFINE® E1010 manufactured by Nissin Chemical Industry Co., Ltd.; SURFINOL® 440, SURFINOL® 465, and SURFINOL® 485 manufactured by Air Products and Chemicals, Inc.; ACETYLENOL® E40 and ACETYLENOL® E100 manufactured by Kawaken Fine Chemicals Co., Ltd. and the like.

In addition to the acetylene surfactant, the water-based ink may contain other surfactants. Examples of other surfactants include nonionic surfactants manufactured by Kao Corporation including the EMULGEN® series, RHEODOL® series, EMASOL® series, EXCEL (registered trademark) series, EMANON® series, AMIET® series, and AMINON® series and the like; nonionic surfactants manufactured by Toho Chemical Industry Co., Ltd. such as Solvon® series and the like; nonionic surfactants manufactured by Lion Corporation such as DOBANOX® series, LEOCOL® series, LEOX® series, LAOL, LEOCOL® series, LIONOL® series, CADENAX® series, LIONON® series, LEOFAT® series, and the like; anionic surfactants manufactured by Kao Corporation such as the EMAL® series, LATEMUL® series, VENOL® series, NEOPELEX® series, NS SOAP, KS SOAP, OS SOAP, PELEX® series, and the like; anionic surfactants manufactured by Lion Corporation such as the LIPOLAN® series, LIPON (registered trademark) series, SUNNOL® series, LIPOTAC® TE, ENAGICOL series, LIPAL® series and LOTAT (registered trademark) series, and the like; and cationic surfactants manufactured by DKS Co. Ltd. such as CATIOGEN® ES-OW and CATIOGEN® ES-L, and the like.

Furthermore, examples of the other surfactants may be a compound expressed by the following formula (1). Compounds expressed by the following formula (1) are, for example, anionic surfactants.

(1)

In formula (1) above,
$R^1$ is an alkyl group,
$R^2$ is an ethylene group or propylene group,
n is a number from 0 to 10, and
M is an alkali metal, alkaline earth metal, ammonium or alkanolamine.

In formula (1), $R^1$ is, for example, an alkyl group with 8 to 18 carbon atoms, $R^2$ is, for example, an ethylene group, and n is, for example, a number from 1 to 10.

In Formula (1), M can be, for example, sodium, potassium, calcium, magnesium, $NH_4$, $NH(C_2H_4OH)_3$, $NH_2(C_2H_4OH)_2$, $NH_3$—$C_2H_4OH$, and the like, but of these, sodium, potassium, and ammonium are preferable.

The compound expressed by formula (1) may be a commercially available product. Examples of commercial products include "SUNNOL® series" manufactured by Lion Specialty Chemicals Co., Ld.; and "EMAR® series" manufactured by Kao Corporation.

One type of surfactant may be used alone, or a combination of two or more types may be used. In other words, the water-based ink may, for example, contain at least one or more surfactants, in addition to the acetylene surfactant. The combination of surfactants is not particularly restricted, and may include, for example, a combination of an acetylene based surfactant and a compound expressed by formula (1) (hereinafter also referred to as combination A). Note that the combination A is simply an example, and the present disclosure is not restricted to combination A. The surfactant can be any combination of an acetylene surfactant and other surfactants, for example. The use of two or more of the surfactants, including the acetylene surfactant, provides better redispersibility, for example.

The formulation amount of surfactant in the total amount of water-based ink can be appropriately selected in accordance with the purpose. The formulation amount of surfactant is, for example, 0.01 mass % to 5 mass %, 0.05 mass % to 5 mass %, or 0.1 mass % to 3 mass %.

The penetrating agent includes at least one alkylene diol and one glycol ether compound. Note that the alkylene diols are diols that contain an alkylene diol as a portion of the structure, and the glycol ether compounds are compounds that contain glycol ether as a portion of the structure. Examples of the alkylene diols include 1,2-hexanediol, 1,2-heptanediol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 1,6-hexanediol, 2-methyl-2,4-pentanediol, 3-methyl-1,5-pentanediol, and the like. Examples of the glycol ether compounds include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n propyl ether, tripropylene glycol-n-butyl ether, and the like.

The water-based ink may contain other penetrating agents in addition to the at least one alkylene diol or glycol ether compound.

One type of the penetrating agent may be used alone or a combination of two or more types may be used.

The formulation amount of the penetrating agent to the total amount of water-based ink is, for example, 1 weight % to 20 weight %, 1 weight % to 15 weight %, or 1 weight % to 10 weight %.

The water may be ion exchanged water, pure water, or the like. The amount of water to be blended in the total amount of water-based ink (water ratio) is determined in accordance with desired ink characteristics and the like. The water ratio may, for example, be the remainder after the other ingredients. The formulation amount of water is, for example, 50 mass % to 95 mass %, 55 mass % to 90 mass %, or 60 mass % to 80 mass %.

The water-based ink contains the pigment, the amino acid, the acetylene surfactant, and one or more penetrating agents selected from the alkylene diols and glycol ether compounds, and by setting the formulation amount of the amino acid to the prescribed amount, both a reduction in the formulation amount of TEA and an improvement in redispersibility can be achieved. The mechanism for improving redispersibility is hypothesized to be as follows. The amino acid has a lot of hydrophilic groups, and is highly effective for moisture absorption. The amino acid is a solid, and does not volatilize but remains in the water-based ink when the water in the water-based ink evaporates, thereby retaining moisture. The amino acid is used as a pH adjusting agent to increase the pH of the water-based ink, thereby enhancing the stabilization of the resin dispersing agent and enabling the pigment to be stabilized and dispersed in the water-based ink. In particular, the present inventors have found that the pH of the water-based ink can be efficiently increased if the amino acid is at least one of lysine or arginine. In addition, the amino acid is an amphoteric ion, and therefore is less likely to cause pigment agglomeration. In light of the foregoing, the use of the amino acid as a pH adjusting agent improves storage stability. However, this is only a hypothesis for the mechanism, and the present disclosure is not limited thereto.

In general, resin-dispersed pigments have lower redispersibility than self-dispersed pigments. However, the water-based ink described above has excellent redispersibility, even when using a resin-dispersible pigment, as shown by the following Examples.

The water-based ink may, for example, further contain a wetting agent.

The wetting agent is not particularly limited, but examples include lower alcohols such as methyl alcohol, ethyl alcohol, n-propyl alcohol, isopropyl alcohol, n-butyl alcohol, sec-butyl alcohol and tert-butyl alcohol, and the like; amides such as dimethylformamide, dimethylacetamide, and the like; ketones such as acetone and the like; keto alcohols such as diacetone alcohols and the like; ethers such as tetrahydrofuran, dioxane, and the like; polyethers such as polyalkylene glycol; alkylene glycol; polyhydric alcohols such as glycerin, trimethylolpropane, trimethylolethane and the like; 2-pyrrolidone; N-methyl-2-pyrrolidone; 1,3-dimethyl-2-imidazolidinone; and the like. Examples of the polyalkylene glycol include polyethylene glycol, polypropylene glycol, and the like. Examples of the alkylene glycol include ethylene glycol, propylene glycol, butylene glycol, diethylene glycol, triethylene glycol, dipropylene glycol, tripropylene glycol, thiodiglycol, hexylene glycol, and the like.

Examples of the wetting agent include 3-methyl-1,5-pentanediol, urea, urea derivatives, and the like.

The urea derivatives include, for example, compounds in which a hydrogen on the nitrogen of urea is replaced with an alkyl group or an alkanol group; thiourea; compounds in which a hydrogen on the nitrogen of thiourea is replaced with an alkyl group or an alkanol group; and the like. Specific examples include N,N-dimethyl urea, thiourea, ethylene urea, hydroxyethyl urea, hydroxybutyl urea, ethylene thiourea, and diethyl thiourea, and the like.

One type of the wetting agent may be used alone, or in a combination of two or more types. In other words, the water-based ink may contain, for example, at least two or more wetting agents. The combination of wetting agents is not particularly limited and may include, for example, a combination of at least one of urea and urea derivatives, and 3-methyl-1,5-pentanediol (hereinafter also referred to as combination B). Note that the combination B is simply an example, and the present disclosure is not limited to combination B. The combination of wetting agents can be any combination of the substances, for example. It is hypothesized that by using at least two types of wetting agents, compatibility between colorants (pigments, and the like) and organic solvents other than the wetting agents (penetrating agents, and the like) is enhanced, and an effect such as excellent redispersibility can be obtained, even if the formulation amount of the wetting agent in the total amount of the water-based ink is small, as compared to increasing the formulation amount of a single type of wetting agent. However, the present disclosure is not limited to the hypothesis.

The formulation amount of the wetting agent in the total amount of the water-based ink is, for example, 0 mass % to 95 mass %, 5 mass % to 80 mass %, or 5 mass % to 50 mass %.

The substances suggested here as penetrating agents are not limited to use as penetrating agents, but can also be used, for example, as wetting agents. Similarly, the substances suggested here as wetting agents are not limited to use as wetting agents, but can also be used, for example, as penetrating agents.

The pH of the water-based ink is, for example, 7 to 12, 7.5 to 11, or 8 to 10.5. By setting the pH to the range, a water-based ink with enhanced redispersibility can be obtained.

The water-based ink may also contain conventionally known additives as needed. The additives include, for example, pH adjusting agents, viscosity adjusting agents, surface tension adjusting agents, anti-mold agents, and the like. Examples of the viscosity adjusting agent include polyvinyl alcohol, cellulose, water-soluble resins, and the like.

The water-based ink may, for example, further contain triethanolamine (TEA) as a pH adjusting agent, or may not substantially contain triethanolamine. From the standpoint of ease of preparation of the water-based ink, it is preferable that the water-based ink be substantially free of triethanolamine. If triethanolamine is included in the water-based ink, the amount should be a sufficiently small amount relative to the formulation amount of the pH adjusting agent (the amino acid) in the total amount of the water-based ink. Specifically, for example, the formulation amount of triethanolamine to the total amount of water-based ink may be 0.1 mass % or less. In addition, the formulation amount of triethanolamine in the total amount of the water-based ink may, for example, be ½ or less, ⅕ or less, or 1/10 or less, of the formulation amount of amino acids in the total amount of the water-based ink. In general, fewer substances in the water-based ink makes preparation of the water-based ink easier. The water-based ink for inkjet recording does not contain TEA or the formulation amount of TEA can be reduced, and therefore the ease of preparation of the water-based ink can be improved. Furthermore, the water-based ink for inkjet recording can reduce the amount of TEA to be produced.

As described above, Patent Document 1 discloses an ink composition containing triethanolamine (TEA) as a pH adjusting agent. However, there is a need to replace triethanolamine with a naturally occurring raw material, in consideration of the environmental impact, as well as the versatility of the water-based ink compositions. In contrast, the water-based ink for inkjet recording of the present disclosure enables replacing triethanolamine with a naturally occurring raw material (the amino acid).

Next, the ink storage container of the present disclosure is an ink container that contains water-based ink for inkjet recording, and the water-based ink is the water-based ink for inkjet recording according to the present disclosure. The ink storage container may be a conventionally known container, for example. Examples of ink storage containers include ink cartridges, tanks, pouches, and the like.

Next, the inkjet recording device and inkjet recording method will be described.

The inkjet recording device of the present disclosure is an inkjet recording device that includes an ink storing part and ink ejecting part, and the ink contained in the ink storing part is ejected by the ink ejecting part. The water-based ink for inkjet recording of the present disclosure is stored in the ink storing part.

The FIGURE illustrates an example configuration of an inkjet recording device of the present disclosure. As illustrated in the drawing, an inkjet recording device 1 includes four ink storage parts (ink cartridge 2 that is also referred to as an ink storage container), an ink ejecting part (inkjet head) 3, a head unit 4, a carriage 5, a drive unit 6, a platen roller 7, and a purging device 8 as major components.

The four ink cartridges 2 contain four colors of water-based ink, one each of yellow, magenta, cyan and black. For example, at least one of the four water-based inks is the water-based ink of the present disclosure. This example shows a set of four ink cartridges 2, but instead, an integrated ink cartridge may be used, having the interior partitioned to form a water-based yellow ink compartment, a water-based magenta ink compartment, a water-based cyan ink compartment, and a water-based black ink compartment. The main body of the ink cartridge may be a conventionally known cartridge main body, for example.

The inkjet head 3 installed in the head unit 4 records on a recording medium (for example, recording paper) P. The four ink cartridges 2 and the head unit 4 are mounted on the carriage 5. The drive unit 6 moves the carriage 5 back and forth in a straight line direction. The drive unit 6 may be any conventionally known drive unit, for example (see, for example, Japanese Unexamined Patent Application No. 2008-246821 (US2008/241398), the contents of which are incorporated herein in their entirety). The platen roller 7 extends in a reciprocating direction of carriage 5 and is disposed opposite the inkjet head 3.

The purging device 8 suctions out defective ink containing air bubbles and the like that accumulates inside the inkjet head 3. For example, a conventionally known purging device can be used as the purging device 8 (see, for example, Japanese Unexamined Patent Application No. 2008-246821 (US2008/241398)).

A wiper member 20 is provided on the platen roller 7 side of the purging device 8, adjacent to the purging device 8. The wiper member 20 is formed in the shape of a spatula, and wipes a nozzle forming surface of the inkjet head 3 as the carriage 5 moves. In the FIGURE, a cap 18 covers a plurality of nozzles of the inkjet head 3 when the head has returned to the reset position after recording is finished, in order to prevent the water-based ink from drying out.

In the inkjet recording device 1 of the present example, the four ink cartridges 2 are mounted on one carriage 5 together with the head unit 4. However, the present disclosure is not limited thereto. In the inkjet recording device 1, each of the four ink cartridges 2 may be mounted on a carriage separate from the head unit 4. Each of the four ink cartridges 2 may be arranged and secured in the inkjet recording device 1, rather than being mounted on the carriage 5. In these embodiments, for example, each of the four ink cartridges 2 and the head unit 4 mounted on the carriage 5 are connected by tubing or the like, and the water-based ink is supplied from each of the four ink cartridges 2 to the head unit 4. Furthermore, in these embodiments, four ink bottles in bottle form may be used instead of the four ink cartridges 2. In this case, the ink bottle preferably has an injection port for injecting ink from the outside into the inside.

Inkjet recording using this inkjet recording device 1 is performed, for example, as follows. First, the recording paper P is fed from a paper feeding cassette (not illustrated) provided on the side or below the inkjet recording device 1. The recording paper P is introduced between the inkjet head 3 and the platen roller 7. Predetermined recording is performed on the introduced recording paper P by the water-based ink ejected from the inkjet head 3. After recording, the recording paper P is ejected from the inkjet recording device 1. In the FIGURE, paper feeding and paper ejecting mechanisms for the recording paper P are omitted.

The device illustrated in the FIGURE uses a serial inkjet head, but the present disclosure is not limited thereto. The inkjet recording device may be a line inkjet head or a roller-to-roller device.

Next, the inkjet recording method of the present disclosure is an inkjet recording method that includes a recording step in which water-based ink is ejected onto the recording medium by an inkjet method, and in the recording step, the water-based ink for inkjet recording of the present disclosure is used as the water-based ink. The inkjet recording method of the present disclosure can be performed, for example, using the inkjet recording device of the present disclosure. The recording includes printing, text printing, image printing, and the like.

EXAMPLES

Next, Examples of the present disclosure will be described along with Comparative Examples. Note that the present disclosure is not limited or restricted by the following Examples and Comparative Examples Preparation of Pigment Dispersions A to C Pure water was added to a mixture of 20 mass % of pigment (C.I. Pigment yellow 74) and 7 mass % of a sodium hydroxide neutralized product of styrene-acrylic acid copolymer (acid value of 175 mg KOH/g, molecular weight of 10,000) to achieve a total of 100 mass %, and then the mixture was stirred to obtain a mixture. The mixture was placed in a wet sand mill filled with 0.3 mm diameter zirconia beads and dispersed for 6 hours. Afterwards, the zirconia beads were removed by a separator and filtered through a 3.0 µm pore diameter cellulose acetate filter to obtain pigment dispersion A. Note that the sodium hydroxide neutralized product of the styrene-acrylic acid copolymer is a water-soluble polymer that is generally used as a pigment dispersing agent. Furthermore, pigment dispersions B and C were obtained in the same manner, except that the pigment type, composition ratio, and dispersion processing time were changed as appropriate.

Preparation of Pigment Dispersion D 40 g of carbon black "#2650" manufactured by Mitsubishi Chemical Corporation was mixed with 200 g of ion-exchanged water and ground in a bead mill. A carboxylating agent was added to the mixture, which was heated and stirred to oxidize. The obtained liquid was then washed several times with solvent, poured into water, repeatedly rinsed, and filtered to obtain pigment dispersion D. The average particle diameter of the carbon black in the pigment dispersion D was measured using an LB-550 manufactured by Horiba, Ltd., and was found to be 153 nm.

Examples 1 to 16 and Comparative Examples 1 to 5

The components of the water-based ink composition (Tables 1 and 2), excluding the pigment dispersions A to D, were uniformly mixed to obtain an ink solvent. Next, the ink solvent was added to the pigment dispersions A to D, and mixed to be uniform. The resulting mixture was then filtered through a cellulose acetate-type membrane filter (pore diameter 3.00 µm) manufactured by Toyo Roshi Kaisha, Ltd. to obtain the water-based ink for inkjet recording of Examples 1 to 16 and Comparative Examples 1 to 5 shown in Tables 1 and 2.

(a) pH measurement and (b) redispersibility evaluation of the water-based inks of Examples 1 to 16 and Comparative Examples 1 to 5 were conducted using the following methods.

(a) pH Measurement

The pH of the water-based inks in each of the Examples and Comparative Examples was measured using a compact pH meter manufactured by Horiba, Ltd.

(b) Redispersibility Evaluation

10 µL of water-based ink of each of the Examples and Comparative Examples was dropped onto a glass slide. The glass slides were then stored at 60° C. and 40% relative humidity for three days to allow the water-based ink to evaporate and solidify. Next, 1 mL of pure water was dropped onto the solids after the storage. The presence of coarse particles and foreign matter in the evaluation samples prepared in this manner was observed visually and under a microscope (200× magnification), and redispersibility was evaluated according to the following evaluation criteria.

Redispersibility Evaluation Criteria

AA: Solids were immediately redispersed (dissolved or dispersed in pure water) by dripping of pure water, and no coarse particles or foreign matter was observed including under microscope observation.

A: Solids were quickly redispersed by dripping pure water, and no coarse particles or foreign matter was observed by visual observation, but coarse particles or foreign matter was observed under microscope observation.

B: Coarse particles or foreign matter was observed by visual observation.

C: Absolutely no redispersion.

The water-based ink compositions and evaluation results of the water-based inks of Examples 1 to 16 and Comparative Examples 1 to 5 are shown in Tables 1 and 2.

TABLE 1

| | | | Example 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| Water based ink composition (mass %) | Colorant | Pigment dispersion A (*1) | 6.0 | 6.0 | 6.0 | 6.0 | 6.0 | 6.0 | 6.0 | 6.0 | 6.0 | 6.0 | 6.0 | 6.0 | 6.0 | — | — | — |
| | | Pigment dispersion B (*2) | — | — | — | — | — | — | — | — | — | — | — | — | — | 6.0 | — | — |
| | | Pigment dispersion C (*3) | — | — | — | — | — | — | — | — | — | — | — | — | — | — | 6.0 | — |
| | | Pigment dispersion D (*4) | — | — | — | — | — | — | — | — | — | — | — | — | — | — | — | 6.0 |
| | pH adjusting agent | Arginine | 0.1 | 0.1 | 0.1 | 0.05 | 1.0 | 0.05 | — | 0.1 | 0.1 | 0.1 | 0.1 | 0.1 | 0.1 | 0.1 | 1.0 | 0.1 |
| | | Lysine | — | — | — | — | — | — | 0.1 | — | — | — | — | — | — | — | — | — |
| | | Triethanolamine | — | — | — | — | — | 0.05 | — | — | — | — | — | — | — | — | — | — |
| | Wetting agent | Glycerin | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| | | Urea | — | — | — | — | — | — | — | — | — | — | — | 2.0 | — | — | — | — |
| | | 3-methyl-1,5-pentandiol | — | — | — | — | — | — | — | — | — | — | — | — | 2.0 | — | — | — |
| | Penetrating agent | Triethylene glycol monobutyl ether | 5.0 | 5.0 | — | 5.0 | 5.0 | 5.0 | 5.0 | — | — | 1.0 | 5.0 | 5.0 | 5.0 | 5.0 | 5.0 | 5.0 |
| | | Dipropylene glycol monopropyl ether | — | — | — | — | — | — | — | — | 2.0 | — | — | — | — | — | — | — |
| | | 1,2-hexandiol | — | — | 2.0 | — | — | — | — | 2.0 | — | 1.0 | — | — | — | — | — | — |
| | Surfactant | Olfine ® E1010 (*5) | — | 0.2 | — | — | — | — | — | — | — | — | — | — | — | — | 0.2 | — |
| | | Olfine ® E1004 (*6) | 0.2 | — | 0.2 | 0.2 | 0.2 | 0.2 | 0.2 | — | — | — | 0.2 | 0.2 | 0.2 | 0.2 | — | 0.2 |
| | | Emal ® 20C (*7) | — | — | — | — | — | — | — | — | — | 0.6 | — | — | — | 0.6 | 0.6 | 0.6 |
| | Water (Rem: Remainder) | | Rem | Rem | Rem | Rem | Rem | Rem | Rem | Rem | Rem | Rem | Rem | Rem | Rem | Rem | Rem | Rem |
| pH | | | 9.0 | 8.9 | 9.0 | 8.4 | 10.2 | 8.4 | 8.8 | 8.8 | 8.9 | 8.9 | 9.0 | 9.0 | 8.9 | 9.1 | 10.2 | 8.5 |
| Redispersibility evaluation | | | A | A | A | A | A | A | A | A | A | A | AA | AA | AA | AA | AA | AA |

(*1): Aqueous dispersion of C.I. Pigment Yellow 74 (containing resin dispersing agent); Values in the table indicate the formulation amount of the pigment solid portion.
(*2): Aqueous dispersion of C.I. Pigment Red 122 (containing resin dispersing agent); Values in the table indicate the formulation amount of the pigment solid portion.
(*3): Aqueous dispersion of C.I. Pigment Blue 15:3 (containing resin dispersing agent); Values in the table indicate the formulation amount of the pigment solid portion.
(*4): Aqueous dispersion of self-dispersing carbon black; Values in the table indicate the formulation amount of the pigment solid portion.
(*5): Acetylene glycol based surfactant; produced by Nissin Chemical Co., Ltd.; Values in the table indicate the formulation amount of the pigment solid portion.
(*6): Acetylene glycol based surfactant; produced by Nissin Chemical Co., Ltd.; Values in the table indicate the formulation amount of the pigment solid portion.
(*7): Anionic surfactant (compound expressed by formula (1)); produced by Kao Corporation; Values in the table indicate the formulation amount of the pigment solid portion.

TABLE 2

| | | | Comparative Example 1 | 2 | 3 | 4 | 5 |
|---|---|---|---|---|---|---|---|
| Water-based ink composition (mass %) | Colorant | Pigment dispersion A (*1) | 6.0 | 6.0 | — | — | — |
| | | Pigment dispersion B (*2) | — | — | 6.0 | — | — |
| | | Pigment dispersion C (*3) | — | — | — | 6.0 | — |
| | | Pigment dispersion D (*4) | — | — | — | — | 6.0 |
| | pH adjusting agent | Histidine | — | 0.1 | — | — | 0.1 |
| | Wetting agent | Glycerin | 20.0 | 20.0 | 20.0 | 20.0 | 20.0 |
| | Penetrating agent | Triethylene glycol monobutyl ether | 5.0 | 5.0 | 5.0 | 5.0 | 5.0 |

TABLE 2-continued

|  |  | Comparative Example | | | | |
|---|---|---|---|---|---|---|
|  |  | 1 | 2 | 3 | 4 | 5 |
| Surfactant | Olfine ® E1010 (*5) | — | — | — | 0.2 | — |
|  | Olfine ® E1004 (*6) | 0.2 | 0.2 | 0.2 | — | 0.2 |
|  | Emal ® 20C (*7) | — | — | 0.6 | 0.6 | 0.6 |
| Water |  | Remainder | Remainder | Remainder | Remainder | Remainder |
| pH |  | 8.2 | 8.0 | 8.5 | 7.9 | 7.6 |
| Redispersibility evaluation |  | C | C | C | C | C |

(*1): Aqueous dispersion of C.I. Pigment Yellow 74 (containing resin dispersing agent); Values in the table indicate the formulation amount of the pigment solid portion.
(*2): Aqueous dispersion of C.I. Pigment Red 122 (containing resin dispersing agent); Values in the table indicate the formulation amount of the pigment solid portion.
(*3): Water dispersion of C.I. Pigment Blue 15:3 (containing resin dispersing agent); Values in the table indicate the formulation amount of the pigment solid portion.
(*4): Aqueous dispersion of self-dispersed carbon black; Values in the table indicate the formulation amount of the pigment solid portion.
(*5): Acetylene glycol surfactant: Nissin Chemical Co. Ltd.; Values in the table indicate the formulation amount of the pigment solid portion.
(*6): Acetylene glycol surfactant: Nissin Chemical Industry Co.: Values in the table indicate the formulation amount of the pigment solid portion.
(*7): Anionic surfactant (compound expressed by formula (1)); produced by Kao Corporation; Values in the table indicate the formulation amount of the pigment solid portion.

As indicated in Table 1, the redispersibility evaluation results were favorable, with a score of "A" or better for Examples 1 to 13. In Examples 1 and 11, the redispersibility evaluation results were better in Example 11, which used a surfactant containing a compound expressed by formula (1), than in Example 1, which had the same conditions except that a surfactant containing a compound expressed by formula (1) was not used. In Examples 14 to 16, where a surfactant containing a compound expressed by formula (1) was used and the pigment type was different from that of Example 11, the redispersibility evaluation results were superior, similar to Example 11. For Examples 1 and 12, Example 12 which contained urea had better redispersibility evaluation results than Example 1, which had the same conditions except that urea was not used. For Examples 1 and 13, Example 13, which contained 3-methyl-1,5-pentanediol, had superior redispersibility evaluation results than Example 1, which had the same conditions except that 3-methyl-1,5-pentanediol was not used.

On the other hand, with Comparative Examples 1 to 5, where an amino acid containing n=3 or more alkylene groups and amino groups on the side chain was not used, the redispersibility evaluation results were inferior.

As described above, the water-based ink can both reduce the formulation amount of TEA and improve redispersibility. The water-based inks of the present disclosure are widely applicable to inkjet recording on various recording media.

Obviously, numerous modifications and variations of the present invention(s) are possible in light of the above teachings. It is therefore to be understood that within the scope of the appended claims, the invention(s) may be practiced otherwise than as specifically described herein.

What is claimed is:

1. A water-based ink, comprising:
a pigment;
an amino acid having an alkylene group with three or more carbon atoms and having amino groups on a side chain thereof;
a surfactant and/or a penetrating agent;
water; and
optionally, triethanolamine in an amount of 0.1 mass % or less relative to a total mass of the water-based ink,
wherein:
the surfactant comprises an acetylene based surfactant;
the penetrating agent comprises an alkylene diol, a glycol ether compound, or both; and
an amount of the amino acid in the water-based ink relative to the total mass of the water-based ink is from 0.05 to 1 mass %, such that redispersibility of the pigment is improved compared to a water-based ink having the same composition except that the amino acid is not included.

2. The water-based ink according to claim 1, wherein the amino acid is arginine, lysine, or both.

3. The water-based ink according to claim 1, further comprising two or more wetting agents.

4. The water-based ink according to claim 3, wherein the two or more wetting agents comprise a urea, a urea derivative, or both.

5. The water-based ink according to claim 3, wherein the two or more wetting agents comprise 3-methyl-1,5-pentanediol.

6. The water-based ink according to claim 1, wherein the pigment is a resin-dispersed pigment.

7. The water-based ink according to claim 1, wherein the surfactant further comprises an additional surfactant, which is different from the acetylene based surfactant.

8. The water-based ink according to claim 7, wherein the additional surfactant comprises a compound of formula (1):

(1)

wherein:
$R^1$ is an alkyl group;
$R^2$ is an ethylene group or a propylene group;
n is a number of 0 to 10; and
M is an alkali metal, an alkaline earth metal, an ammonium or an alkanolamine.

9. The water-based ink according to claim 1, wherein the water-based ink is suitable for inkjet recording.

10. An inkjet recording method, comprising:
ejecting the water-based ink according to claim 1 onto a recording medium using an inkjet method.

11. An inkjet recording device, comprising:
an ink storing part;
the water-based ink according to claim 1, stored in the ink storing part; and
an ink ejecting part configured to eject the water-based ink.

12. An ink storage container comprising the water-based ink according to claim 1, stored therein.

13. A printed recording medium, comprising:
a recording medium; and
the water-based ink according to claim 1, provided on the recording medium.

14. The water-based ink according to claim 1, wherein the water-based ink does not comprise triethanolamine.

15. The water-based ink according to claim 1, wherein the water-based ink comprises triethanolamine.

* * * * *